May 19, 1959   L. WARREN   2,887,325
TOW CAR HITCH
Filed April 8, 1957

INVENTOR.
LEE WARREN
BY
ATTORNEY

2,887,325
Patented May 19, 1959

2,887,325

TOW CAR HITCH

Lee Warren, Burbank, Calif.; Barbara H. Warren, administratrix of said Lee Warren, deceased Application April 8, 1957, Serial No. 651,227

2 Claims. (Cl. 280—502)

This invention relates to an improved tow car hitch, and has for one of its principal objects, the provision of a device of the class described, which will be particularly adaptable for use in towing an automobile or other vehicle by means of another car.

One of the important objects of this invention is to provide a hitch means for a car to be towed, which can be readily fitted onto either car in a minimum space of time and with very little effort.

Another object of this invention is to provide a means for connecting the rear of a power-actuated car to the front end of a car to be pulled, which will be simple of attachment, easy of operation and which will further insure a proper tracking of one car behind the other with maximum safety requirements.

Yet another important object of the invention, resides in the provision of a tow car hitch which is particularly adaptable for use by law enforcement or other similar agencies, whereby cars which are parked illegally or which are to be repossessed, can be practically immediately attached to a towing vehicle and transported from one place to another without the necessity of gaining access to the interior of the car to be towed or the procurement of ignition or other keys for said transportation purposes.

Other and further important objects of the invention will be apparent from the disclosures in the accompanying drawings and following specification.

The invention, in a preferred form, is illustrated in the drawings and hereinafter more fully described.

Figure 1:
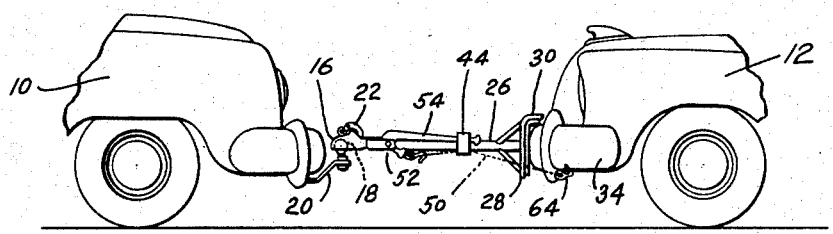
Figure 1 is a side elevation of the improved tow car hitch of this invention, showing the same as in actual use.

The reference numeral 10 indicates generally an automobile or other vehicle which will be designated as the towing car and with which the improved hitch of this invention is used. The reference numeral 12 indicates the car to be towed.

The tow car hitch itself comprises primarily a connecting element 14 which includes a socket 16 adapted to be applied to the ball 18 of any usual or preferred ball and socket connection 20 which is either permanently or temporarily fastened to the rear of the towing car 10. This device may be of any preferred construction and includes a latch element 22 by means of which the ball and socket joint is firmly held together for the towing operation.

Figures 2, 5:
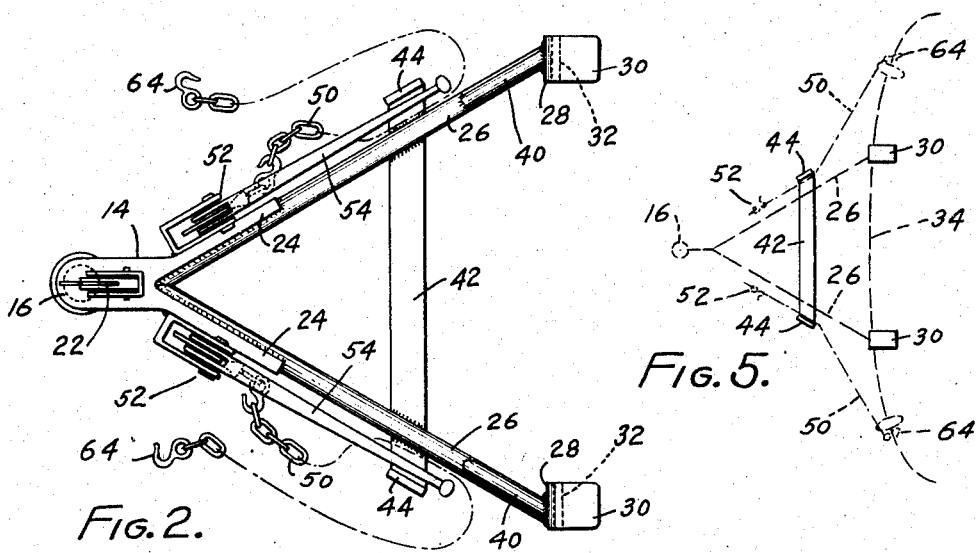
Figure 2 is an enlarged top plan view of the tow car hitch, parts being broken away and other parts being illustrated diagramatically for a better understanding of the structure and operation thereof.
Figure 5 is a view, substantially diagrammatic, illustrating the method of application of the hitch of this invention to a car which is to be towed.

The element 14 includes bifurcations 24, which are preferably integral therewith and V-shaped as shown in Figure 2.

A tubular or other extension 26 is welded or similarly attached to each of the bifurcated elements 24 and these extensions 26 are of a desired predetermined length, whereby a ready connection of one car to the other can be accomplished while at the same time unwieldiness is avoided.

Figure 3:
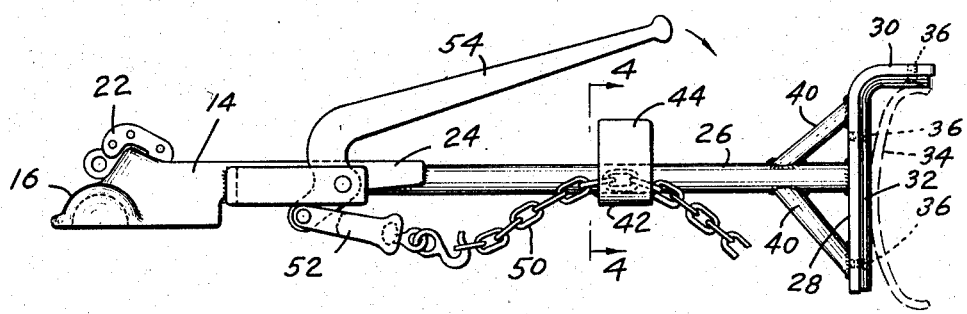
Figure 3 is a side elevation of the hitch as shown in Figure 2, illustrating further important operating features thereof.
Figure 4:
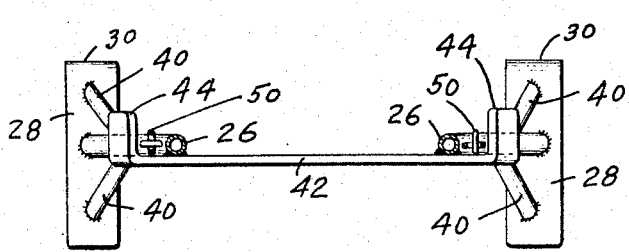
Figure 4 is a vertical section taken on the plane of the line 4—4 of Figure 3, looking in the direction indicated by the arrows.

Each of the extensions 26 terminate in a vertical bracket element 28, preferably shaped as shown in Figure 3, with an overhanging horizontal portion 30 and each bracket is provided with an innerfacing 32 of rubber, or some suitable cushioning element, whereby the hitch can be applied to the bumper 34 of the car 12 without any danger of marring or scratching the bumper while at the same time a very firm and secure connection is accomplished.

The rubber or other cushioned facings 32 can be applied to the bracket elements 28—30 in any convenient manner, such as by bolts or screws 36. The facings may be also vulcanized into position.

As best shown in Figure 3, braces 40 are provided as additional supports for the brackets 28—30—32 and these preferably comprise pipes, tubes, strips or the like, which are usually welded in position, but the other fastening means may obviously be employed.

A cross brace 42 connects the diverging extensions 26 at points approximating their middle portions, all as best shown in Figure 2, and this cross brace 42 is also usually welded in position to provide a unitary solid structure. The ends of this cross brace 42 are turned upwardly as at 44 and thereby serve a dual purpose.

One purpose is to retain adjacent portions of connecting chains 50 in desired relationship to the hitch and to the bumper 34 of the car to be towed.

As best shown in Figures 2 and 5, each of the chains 50 is connected at one end to a chain tightener 52 which includes an operating handle 54. Each chain tightener is welded or otherwise affixed to its juxtaposed bifurcation 24 of the hitch element 14, and this connection is usually also accomplished by welding, as heretofore described.

Also, as diagrammatically described in Figure 5, the chains 50 are of such a length that they can be readily and conveniently fastened to the outer supports of the bumper 34 of the car 12, which is to be towed, and this end of each of the chains 50 is provided with a hook 64, whereby a connection to an intermediate portion thereof can readily be made after the same is wrapped around the desired portion of the bumper 34. This connection is made fairly tight and the handles 54 of the chain tighteners 52 are then pushed down into approximately the position shown in Figures 1 and 3, thereby effecting a very secure connection of one car to the other and assuring of a proper towing operation and a desired tracking of the car 12 behind the car 10, even though there is no operator in the car 12.

The upturned edges 44 of the cross brace 42 are of a sufficient height to insure suitable retention of the chains 50 with their forward ends in a parallel relationship to the elements 24 and 26 so that there will be no undesirable sidewise strain on the chain tighteners 52—54 while at the same time the chains 50 diverge beyond their contact with the projections 44 whereby a necessary extended connection to the bumper 34 of the car to be towed is accomplished.

The upturned ends 44 of the cross-brace 42 accordingly serve another purpose; namely, to maintain the middle portion of the chains 50 in desired position to eliminate a sidewise pull, while at the same time allowing of a subsequent divergence for a more satisfactory connection to the remote ends of the bumper 34 of the towed car. The ends of the cross brace 42 also serve as stops for limiting the tightening movement of the handles 54 of the elements 52 and the cross-brace further supports the chains in a manner to prevent accidental displacement when rough roads are encountered.

In many instances, the hooks 64 on the ends of the chains 50 can be attached directly to the frame or chassis of the car to be towed, whereby shorter chains can be used and the connection is made with less difficulty and practically no noise, which is important in some cases. Other types of chain tighteners can also be employed, and the chains may be either permanently or releasably connected to the tighteners.

Obviously, the connecting of one car to the other can, by employing the tow car hitch of this invention, be accomplished in a minimum space of time and with very little effort on the part of the operator. This is often quite essential, particularly in the case of repossessing automobiles or cars which have been illegally parked, or possibly abandoned on busy highways, where they constitute a menace to traffic.

The tow car hitch of this invention is relatively small, can easily be handled by one person, as it combines maximum strength and sturdiness with minimum weight and a correspondingly small number of parts. When not in use, it can easily be stored in the trunk of the owner's or operator's car and can be placed into full operation within a very short length of time whenever occasion arises.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

1. A tow car hitch comprising a ball and socket connection, bifurcated extensions thereon, plates on the ends of the extensions adapted to contact the bumper of a car to be towed, chains on the hitch for connection to the car to be towed, chain tighteners for the chains, a cross-brace connecting the bifurcations, said cross-brace also serving as a restraining means for the chains, the chain tighteners including operating handles adapted to be seated against the cross brace when in operating position.

2. A device as described in claim 1, wherein the cross-brace includes upwardly extending ends for contact of the chains therewith.

References Cited in the file of this patent

UNITED STATES PATENTS

| | | |
|---|---|---|
| 1,435,064 | Holmes | Nov. 7, 1922 |
| 1,836,806 | Larsen | Dec. 15, 1931 |
| 2,338,934 | Gross | Jan. 11, 1944 |
| 2,490,645 | Murat | Dec. 6, 1949 |
| 2,585,768 | Ham | Feb. 12, 1952 |
| 2,782,944 | Macklin | Feb. 26, 1957 |